(12) United States Patent
Chaput

(10) Patent No.: US 9,526,004 B2
(45) Date of Patent: Dec. 20, 2016

(54) METHOD OF AND APPARATUS FOR PROVIDING AN INDICATION OF DATA CONSUMPTION

(75) Inventor: Jean-Baptiste Chaput, San Francisco, CA (US)

(73) Assignee: ORANGE, Paris (FR)

( * ) Notice: Subject to any disclaimer, the term of this patent is extended or adjusted under 35 U.S.C. 154(b) by 110 days.

(21) Appl. No.: 14/126,717

(22) PCT Filed: Jun. 14, 2012

(86) PCT No.: PCT/IB2012/001445
§ 371 (c)(1),
(2), (4) Date: Aug. 19, 2014

(87) PCT Pub. No.: WO2012/172430
PCT Pub. Date: Dec. 20, 2012

(65) Prior Publication Data
US 2014/0359710 A1    Dec. 4, 2014

Related U.S. Application Data

(60) Provisional application No. 61/497,197, filed on Jun. 15, 2011.

(51) Int. Cl.
*H04L 29/06*        (2006.01)
*G06F 21/00*        (2013.01)
(Continued)

(52) U.S. Cl.
CPC .......... *H04W 12/06* (2013.01); *G06F 3/04817* (2013.01); *H04L 43/045* (2013.01);
(Continued)

(58) Field of Classification Search
CPC ... H04W 12/06; G06F 3/04817; H04L 43/045; H04L 67/36; H04L 67/2819; H04L 67/22; H04L 12/1435; H04L 43/0888; H04M 15/67; H04M 15/885
See application file for complete search history.

(56) References Cited

U.S. PATENT DOCUMENTS 8,359,389 B1 * 1/2013 Cohen ............... H04W 4/20
                                              705/23
9,137,620 B1 * 9/2015 Mirza ............... H04W 4/00
(Continued)

FOREIGN PATENT DOCUMENTS

| EP | 1777611 A1 | 4/2007 |
|---|---|---|
| EP | 2061225 A2 | 5/2009 |
| WO | 2008024564 A2 | 2/2008 |

OTHER PUBLICATIONS

International Search Report and Written Opinion dated Jan. 8, 2013 for corresponding International Application No. PCT/IB2012/001445, filed Jun. 14, 2012.

*Primary Examiner* — Lisa Lewis
(74) *Attorney, Agent, or Firm* — David D. Brush; Westman, Champlin & Koehler, P.A.

(57) ABSTRACT

A method and apparatus providing an indication of data consumption by an application, which is executable on an electronic device and operable to consume data, via a network, from at least one remote content provider server. The method includes: providing, on the electronic device, an iconic representation for the application, the iconic representation having an indication of previous data consumption by the application from the at least one remote content provider server during previous execution of the application; executing the application in response to selection of the iconic representation; receiving, from the network, data representative of new data consumption with the at least one remote content provider server during the execution of the application; and providing an updated iconic representation for the application. The updated iconic representation
(Continued)

includes an indication of updated data consumption based on the received data representative of the new data consumption and the previous data consumption.

16 Claims, 7 Drawing Sheets

(51) Int. Cl.
*H04W 12/06* (2009.01)
*H04M 15/00* (2006.01)
*H04L 29/08* (2006.01)
*G06F 3/0481* (2013.01)
*H04L 12/26* (2006.01)
*H04L 12/14* (2006.01)

(52) U.S. Cl.
CPC ............ *H04L 67/36* (2013.01); *H04M 15/67* (2013.01); *H04M 15/885* (2013.01); *H04L 12/1435* (2013.01); *H04L 43/0888* (2013.01); *H04L 67/22* (2013.01); *H04L 67/2819* (2013.01)

(56) References Cited

U.S. PATENT DOCUMENTS

| | | | |
|---|---|---|---|
| 2007/0078972 A1* | 4/2007 | Yagishita | G06F 3/0605 709/224 |
| 2007/0189514 A1 | 8/2007 | Mehta et al. | |
| 2011/0019574 A1 | 1/2011 | Malomsoky et al. | |
| 2011/0151831 A1* | 6/2011 | Pattabiraman | H04L 12/14 455/405 |
| 2011/0275344 A1* | 11/2011 | Momtahan | H04L 12/14 455/405 |
| 2011/0283230 A1* | 11/2011 | Gnanasambandam | H04M 1/72522 715/810 |
| 2011/0294502 A1* | 12/2011 | Oerton | H04W 4/001 455/426.1 |
| 2012/0054661 A1* | 3/2012 | Rados | H04L 41/5032 715/772 |
| 2012/0110174 A1* | 5/2012 | Wootton | G06F 21/564 709/224 |
| 2012/0155296 A1* | 6/2012 | Kashanian | H04L 12/1417 370/252 |
| 2012/0167122 A1* | 6/2012 | Koskimies | G06F 9/5027 719/328 |
| 2012/0250586 A1* | 10/2012 | Ahmavaara | H04L 41/0896 370/259 |
| 2012/0265804 A1* | 10/2012 | Ashcraft | G06F 9/5016 709/203 |
| 2013/0122854 A1* | 5/2013 | Agarwal | H04L 12/141 455/405 |
| 2013/0159395 A1* | 6/2013 | Backholm | H04L 29/08099 709/203 |
| 2013/0267209 A1* | 10/2013 | Bott | H04W 4/16 455/414.1 |
| 2014/0128027 A1* | 5/2014 | Ghosh | H04L 12/141 455/407 |
| 2014/0179266 A1* | 6/2014 | Schultz | H04W 4/24 455/406 |
| 2014/0365023 A1* | 12/2014 | Kiefhaber | G06Q 50/06 700/291 |
| 2015/0105043 A1* | 4/2015 | Puvvula | H04M 15/844 455/405 |

\* cited by examiner

METHOD OF AND APPARATUS FOR PROVIDING AN INDICATION OF DATA CONSUMPTION

CROSS-REFERENCE TO RELATED APPLICATIONS

This Application is a Section 371 National Stage Application of International Application No. PCT/IB2012/001445, filed Jun. 14, 2012, which is incorporated by reference in its entirety and published as WO 2012/172430 A2 on Dec. 20, 2012, in English.

FIELD OF THE INVENTION

The present invention relates in general to a method and apparatus for providing an indication of data consumption. Particularly, but not exclusively, the invention relates to a method of and apparatus for providing an indication of data consumption by an application on a user terminal communicating with a remote server over a network.

BACKGROUND OF THE INVENTION

As software applications and services installed on mobile user devices become more and more data hungry, the management of data consumption is becoming increasingly important.

In some cases there is a restriction imposed on the amount of data a user may consume. This restriction may be imposed by a particular data plan, limited data access for a promotional launch of an application or service, data consumption coupons, and the like. Such restrictions require an effective management of data consumption to ensure a data consumption limit is not exceed which may in some cases result in financial penalties.

SUMMARY OF THE INVENTION

Accordingly, a first aspect of the invention provides a method for providing an indication of data consumption by an application said application being executable on an electronic device and operable to consume data, via a network, from at least one remote content provider server, the method comprising: providing, on the electronic device, an iconic representation for the application, the iconic representation comprising an indication of previous data consumption by the application from said at least one remote content provider server during previous execution of the said application; executing the application in response to selection of the iconic representation; receiving, from the network, data representative of new data consumption with the at least one remote content provider server during the execution of the application; and providing an updated iconic representation for the application wherein the updated iconic representation includes an indication of updated data consumption based on the received data representative of the new data consumption and the previous data consumption.

A second aspect of the invention provides a method for providing an indication of data consumption by an application, said application being executable on an electronic device and operable to consume data, via a network, from at least one remote content provider server, the method comprising: providing an iconic representation for the application, the iconic representation comprising an indication of previous data consumption by the application from said at least one remote content provider server during previous execution of the said application, identifying, on the network, data traffic, associated with the application, between the said electronic device and the at least one remote content provider server; measuring the said data traffic to determine new data consumption of the application on the said electronic device from the at least one remote content provider server during the execution of the application, transmitting, from the network to the electronic device, data representative of new data consumption to enable an updated iconic representation for the application to be provided, wherein the updated iconic representation includes an indication of updated data consumption based on the received data representative of the new data consumption and the previous data consumption.

A third aspect of the invention provides a user terminal operable to receive data via a network, the user terminal comprising an application module for executing an application operable to consume data, via the network, from at least one remote content provider server, a display for displaying an iconic representation of the application, the iconic representation comprising an indicator for indicating previous data consumption by the application from said at least one remote content provider server during previous execution of the said application, and wherein the application is executable in response to selection of the iconic representation; a transceiver for receiving, from the network, data representative of new data consumption with the at least one remote content provider server during the execution of the application; and a processor for providing an updated iconic representation for the application wherein the indicator of the updated iconic representation indicates updated data consumption based on the received data representative of the new data consumption and the previous data consumption.

A fourth aspect of the invention provides a network device for providing an indication of data consumption by an application, said application being executable on an electronic device and operable to consume data, via a network, from at least one remote content provider server, the application being represented on the electronic device by an iconic representation comprising an indication of previous data consumption by the application from said at least one remote content provider server during previous execution of the said application, the network device comprising: a data traffic detector for identifying, on the network, data traffic, associated with the application, between the said electronic device and the at least one remote content provider server; a data traffic meter for measuring the said data traffic to determine new data consumption of the application on the said electronic device from the at least one remote content provider server during the execution of the application, a transceiver for transmitting, from the network to the electronic device, data representative of new data consumption to enable an updated iconic representation for the application to be provided, wherein the updated iconic representation includes an indication of updated data consumption based on the received data representative of the new data consumption and the previous data consumption.

In embodiments of the invention:

the iconic representation is updated after the application is exited.

usage of the application is associated with a data consumption allowance parameter defining a maximum data consumption limit for a user, the method may further comprise comparing the updated data consumption with the data consumption allowance parameter; and at least one of exiting the application and receiving a notification, when the updated data consumption reaches the maximum data consumption the previous data consumption may be compared with the data consumption allowance parameter wherein if the previous data consumption parameter has reached the data consumption allowance parameter, notification prior to execution of the application may be received and/or execution of the application may be impeded.

at least one of a user terminal identifier identifying the electronic device, an application identifier identifying the application being executed, and a user identifier identifying the user of application being executed may be transmitted to the network.

the iconic representation is generated by a network server and accessible on the electronic device by means of a browser page.

the iconic representation is generated by an data consumption application on the user terminal.

the network device may receive a user terminal identifier identifying the electronic device, an application identifier identifying the application being executed, a user identifier identifying the user of the application being executed, and a service provider key identifying the service provider providing network service to the electronic device.

the network device may receive a request from the electronic device to access data on the at least one remote content provider server; verify the authenticity of the request based on at least one of the user terminal identifier, the application identifier, and the user identifier; and enable a session between the at least one remote content provider server and the electronic device for the flow of data traffic between the at least one remote content provider and the electronic device, in the case where the request is authenticated.

the network device may receive a data consumption allowance parameter defining a maximum data consumption limit, the method further comprising comparing the updated data consumption with the data consumption allowance parameter; and terminating the session between the electronic device and the content provider server and/or transmitting a notification, to the electronic device, when the updated data consumption exceeds the maximum data consumption.

data access rights for data traffic between the said at least one content provider server and the electronic device may be determined based on the data consumption allowance parameter and the updated data consumption data.

At least parts of the methods according to the invention may be computer implemented. The methods may be implemented in software on a programmable apparatus. They may also be implemented solely in hardware or in software, or in a combination thereof.

Since at least parts of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

Figure 1:
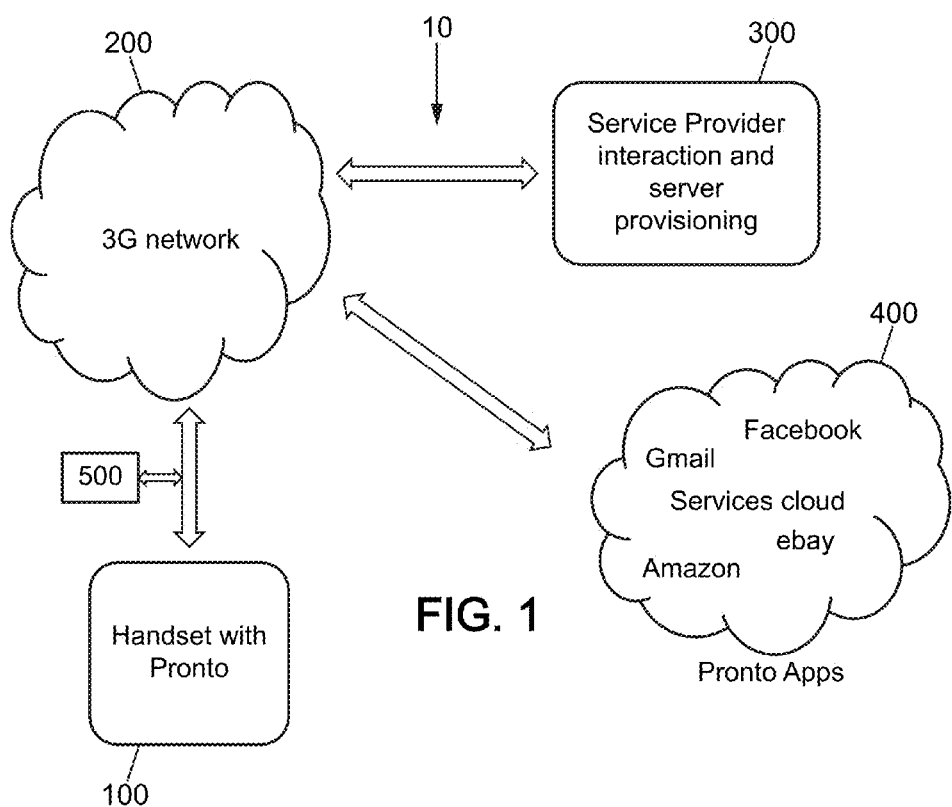
FIG. 1 is a schematic diagram of a network according to an embodiment of the invention.

Embodiments of the invention will be described with reference to the FIGS. 1 to 3. FIG. 1 illustrates some of the main components of a system 10 in which an indication of data consumption may be provided to a user of an application installed on a wireless communication 100. The system 10 includes a 3G network 200 to which is connected a user terminal 100 on which the application is installed, a service provider server 300 and at least one application provider server 400. A data consumption controller 500 is installed on the network system to monitor the data consumption of at least one application on the mobile communication device 100. The data consumption controller 500 may be installed at a national level of the network between the user terminal 100 and the service provider server 300.

Figure 2A:
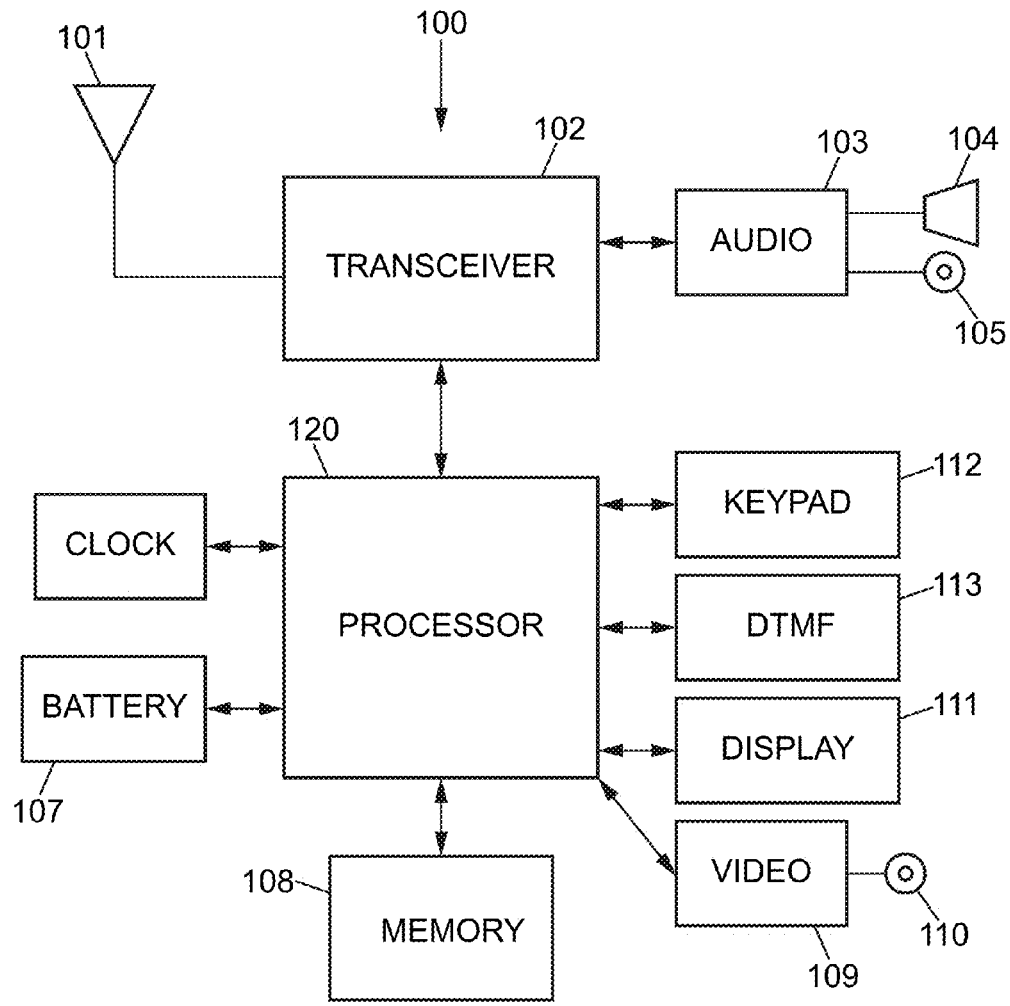
FIG. 2A is a schematic diagram of a wireless communication device according to at least one embodiment of the invention.
Figure 3:
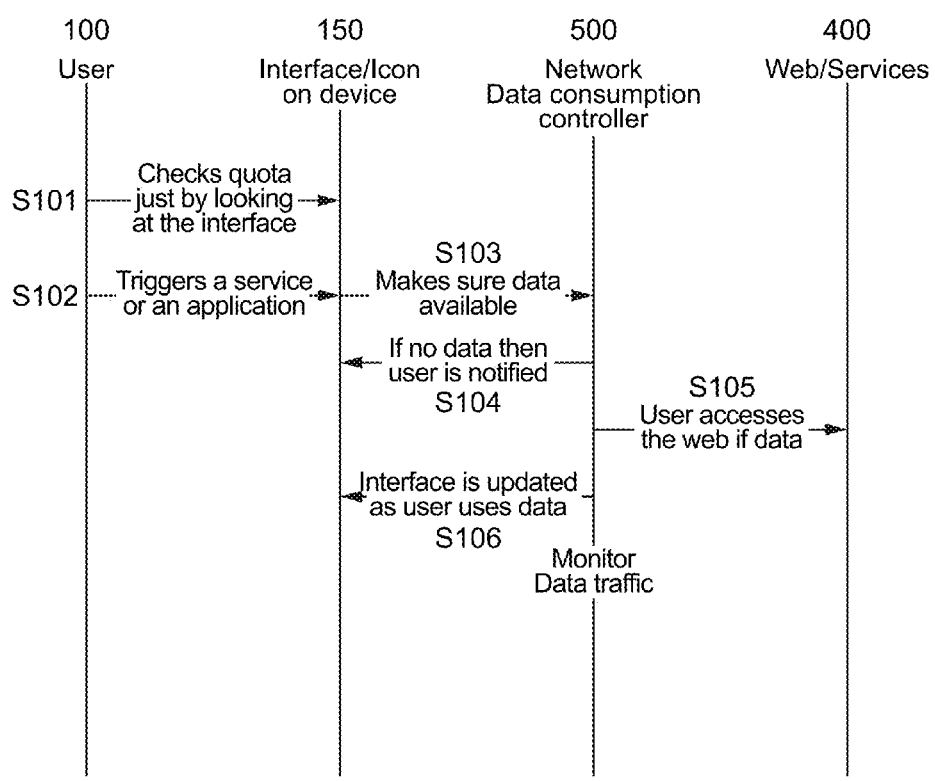
FIG. 3 is a communication diagram of a method of providing an indication of data consumption according to a first embodiment of the invention.

FIG. 2A illustrates some of the main components of a non-limiting example of a user terminal 100 that may be used in the context of the invention. The user terminal 100, in this embodiment, is a wireless communication device 100 comprising conventional circuitry for performing the main functions of a mobile phone, such as a mobile smart-phone, and includes one or more antennas 101 and a transceiver unit 102 for the transmission and reception of wireless signals; an audio unit 103 with a speaker 104 and a microphone 105; a clock 106; a battery 107; a memory 108, a video unit 109 with camera 110 for capturing still and/or video images, a display screen 111 for displaying information to the user, a keypad for receiving a user input 112 and a processor 120. The wireless communication device may include further units such as a GPS unit for indicating the geographical location of the wireless communication device and other such units included in mobile wireless communication devices. The memory 108 may include one or more memory circuits including non-volatile memory circuits (EEPROM, FLASH etc.)

Depending on the capabilities of the wireless communication device and the supporting telecommunication networks the wireless communication device 100 can also provide a range of voice and data communication services. As non-limiting examples the illustrated wireless communication device provides telephone network based communication services including voice, multimedia and text messaging, as well as other data exchange capabilities, enabling internet access and email exchange, for example.

Figure 2B:
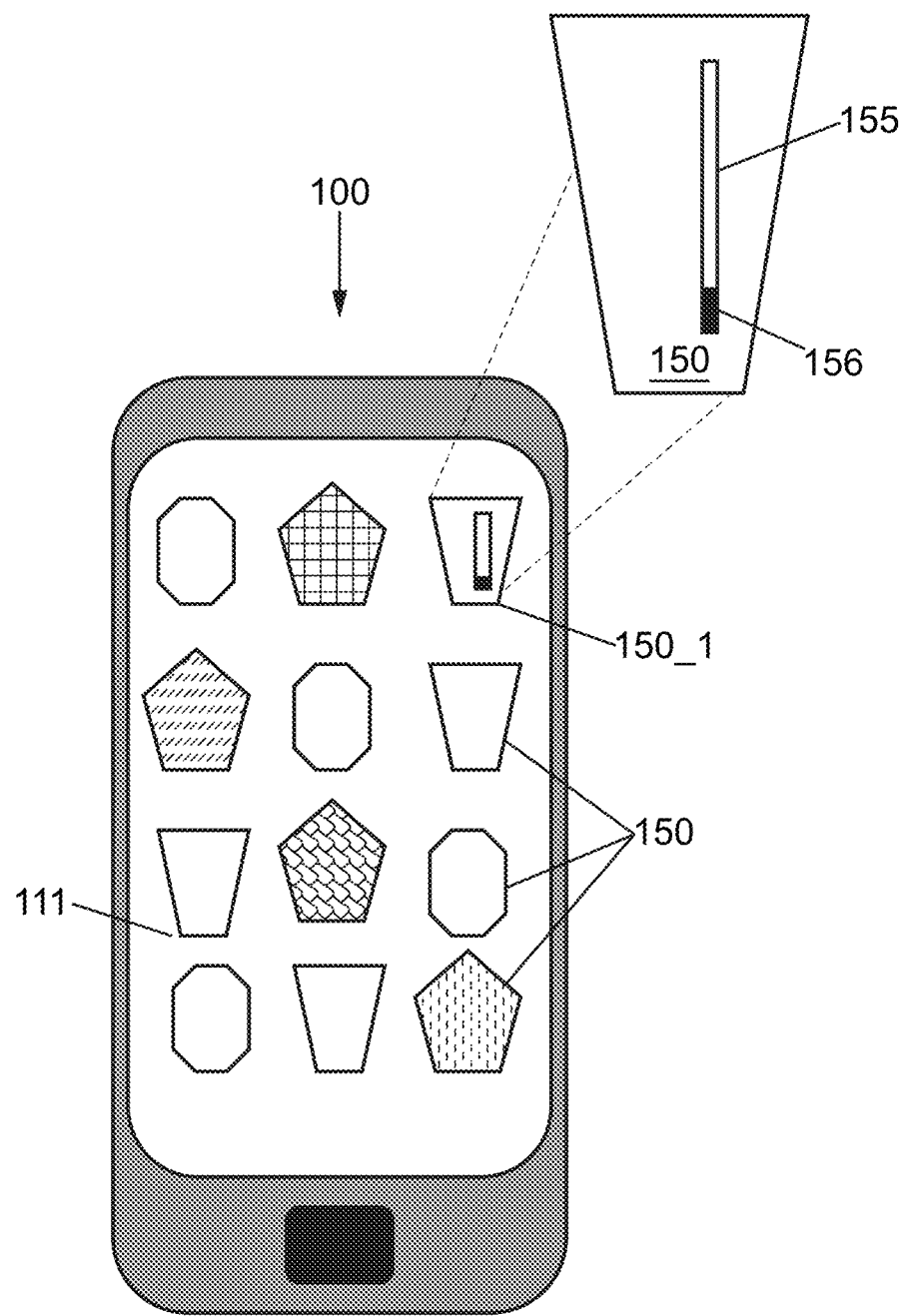
FIG. 2B is a block diagram indicating some components of a wireless communication device according to at least one embodiment of the invention.

As illustrated in FIG. 2B, the display screen 111 of the wireless communication device is a touch sensitive screen and the keypad 112 is a virtual keypad displayed, when activated, on the touch sensitive screen 111.

The wireless communication device 100 is configured to exchange data via the 3G network 200 with remote servers 400, and to enable data exchange enabling internet access. The device 100 is operable to have applications or widgets installed, such as, but not limited to social networking applications or email applications, for example, which when executed may exchange data with the remote servers 400. Each application or widget installed on the user terminal 100 may have an associated graphical user interface, in the form of an application icon 150 providing an iconic representation of the application or widget, displayed on the touch sensitive screen 111.

While in the non-limiting example illustrated in FIGS. 2A and 2B the user terminal 100 is a wireless mobile telephone providing the main functions of a mobile phone, as well as email and Internet access, it will be appreciated, in alternative embodiments of the invention, the user terminal may be a computer processing device, such as a portable laptop or a fixed computer terminal.

The icon 150 displayed on the screen and associated with a data consuming application includes an iconic data consumption portion 155 representing the data consumption of the associated application. In this example, the data consumption portion includes a bar, which decreases in length as more data is consumed. As the application consumes data the bar decreases in length and changes colour as the data consumption reaches a data consumption limit corresponding to a maximum data consumption allowance quota. It will be appreciated that in other embodiments of the invention the data consumption icon portion may take any shape or form which is modified in size and/or form as data associated with the application is consumed. Each application, installed on the user terminal 100 is provided with an application identifier APPID enabling the application being executed to be identified by a network entity. The application identifier APPID may also be used for appropriate billing to the service provider 300 of the user terminal 100.

The wireless communication device 100 is provided with a SIM card (not shown) providing a user terminal identifier, associated with a particular user's account. The application may have a user ID associated with a particular user of the application which can be used in by a service provider 300 to bill the user. The user ID may be encoded or scrambled for privacy or security purposes.

The data consumption controller 500 is configured to identify the user terminal by means of the user terminal identifier, to identify the application being executed by means of the application identifier APP ID and to identify and measure the data being consumed by the application identified by the application identifier APP ID on the identified user terminal. The data consumption controller can may in some embodiments of the invention measure data traffic transmitted from the application as well as data transmitted to the application. The data controller 150 has access to information concerning the data consumption rights of the user of the application. For example the user may have a set data consumption quota per month in accordance with a monthly plan, or a set data consumption limit corresponding to a prepaid credit, or the like in relation to a particular application or a number of applications installed on the user terminal 100.

A method for providing an indication of data consumption by an application installed on the user terminal 100, according to an embodiment of the invention will be described with reference to FIG. 3.

In step S101 of the method of an embodiment of the invention, the user of user terminal 100 checks the amount of data already consumed by the application represented by icon 150_1 by checking data consumption portion 155 on display of the user terminal 100. If the application has been previously executed, the length of bar 156 will have decreased by an amount corresponding to the quantity of data already consumed. If there has been no previous execution of the application, the length of the bar 156 will correspond to the maximum data consumption limit.

In some embodiments of the invention the data consumption limit may be related to the quantity of data consumed within a pre-set time period. For example, a user may have a pre-set monthly data consumption limit. During the pre-set time period the bar 156 of the data consumption portion 155 will decrease as data is consumed by the application. At the beginning of a new time period the length of bar 156 will be refreshed to the bar level corresponding to full monthly data consumption limit and the bar length will again decrease as the application is executed and data is consumed by the application during the pre set time duration.

In some embodiments of the invention the data consumption limit may be increased or decreased if for example the user tops up the prepaid credit or changes his data consumption plan, or if the service provider tops up the credit or changes the data consumption plan. Such changes to the data consumption limit may be taken into account by the data controller 500. The network controller 500 can then transmit data representing the change in data consumption limit to the user terminal so that the data consumption portion 155 of the application icon can be modified accordingly.

If the user after checking the data consumption level on the display 111 wishes to execute the application, the icon 150_1 is selected in step S102 by the user, by for example touching the icon 150_1 or moving a pointer and clicking on the icon 150_1 and the application is triggered. The application may prompt the user for log in details such as a user name and password, particular to the user of the user terminal 100, if such details are not stored in the application and not automatically input when the said application is launched on the terminal 100.

The network data controller 500 receives from the application on the user terminal 100 a request to access data on the content provider server 400. The request may include the user terminal identifier provided by the SIM or IMSI and the application identifier. In some embodiments the request may also include the user ID related to the application and the service provider ID. The network data controller 500 can thereby identify the user terminal 100, and the application being executed. The network data controller 500 can also verify the authenticity of the request from the application on the user terminal 100 to access data on the content provider server 400 based on the user terminal identifier, the application ID, and in some cases the user identifier. In this way a session between the remote content provider server 400 and the user terminal 100 can be enabled for the flow of data traffic between the remote content provider 400 and the user terminal 100, in the case where the request is authenticated.

In step S103 the user terminal 100 interacts with the network data controller 500 to determine if the maximum data consumption limit has been reached. The network data controller 500 compares the previous data consumption level with a data allowance consumption parameter corresponding to the maximum data consumption limit. If the maximum data consumption limit has been reached a notification is transmitted to the user terminal 100 from the network controller 150 to notify the user that the maximum data consumption limit has been reached. In some embodiments of the invention execution of the application can be impeded if the maximum data consumption limit is reached, otherwise if the maximum data consumption limit has not been reached the application executes enabling the user to access the content provider server 400 associated with the application in step S105 and to receive data from the content provider server 400.

In step S106 the network controller identifies and monitors the data traffic flowing from the content provider server 400 to the user terminal 100 for the application being executed. The network controller 500 measures the new amount of data consumed by the application since the application was triggered. The new amount of data consumed may be added to the previous amount of data consumed and compared with the maximum data consumption limit. If the maximum data consumption limit is reached, the network controller may inform the user terminal 100 so that the application may be automatically stopped and/or the user notified. Otherwise the application continues executing until stopped by the user.

When the application is stopped the network data controller 500 determines the new amount of data consumed during the session between the application and the content provider server and sends to the terminal 100 data representative of the amount of new data consumed since the application was triggered. The data consumption portion 156 of the application icon 155 is modified according to the amount of new data consumed. In some embodiments the user terminal calculates the updated amount of data consumed, while in other embodiments the network data controller determines the updated amount of data consumed while in further embodiments the use terminal includes a data consumption estimated value which is updated periodically by a real data consumption value from the network controller.

In this embodiment the length of the bar 156 is further shortened to take account the new consumption of data. The length of the bar should correspond to the amount of previous data consumed and the amount of new data consumed to provide an updated data consumption level.

Figure 4:
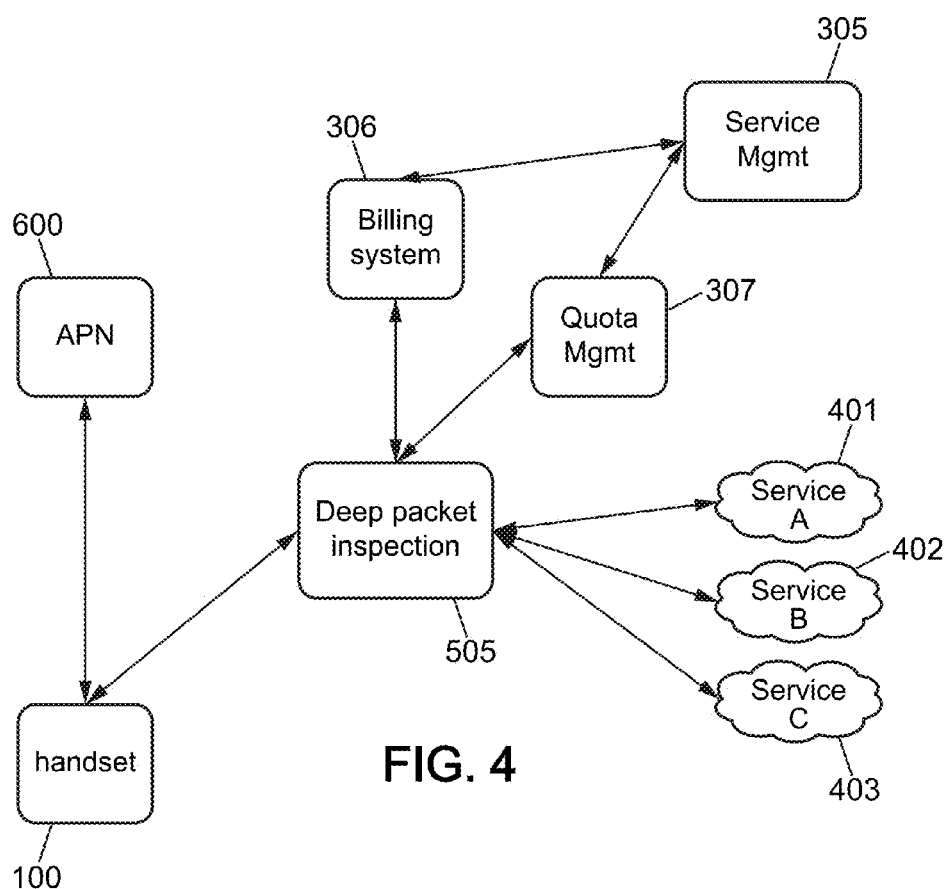
FIG. 4 is a more detailed schematic diagram of a network according to an embodiment of the invention.

A more detailed view of the network system according to an embodiment of the invention is provided in FIG. 4. The network system includes a user terminal 100 provided with a SIM card, a gateway device 600, a deep packet inspection (DPI) device 505, a service provider management device 305, a billing system 306, a data consumption quota management device 307, a first content provider server 401 providing service A, a second content provider server 402 providing service B, and a third content provider server 403 providing service C. The gateway device may be an APN (Access Point Name) device. In this embodiment of the invention the network controller comprises the deep packet inspection device 505.

When the user of the user terminal 100 launches an application associated with an icon 150 requesting data content from one of the content provider servers 401, 402 or 403, the APN device 600 determines if the user terminal 100 has an external IP address. If the user terminal 100 has an external IP address the request to access data content is transferred to DPI device 505. If the user terminal 100 does not possess an IP address, an external IP address is assigned to the user terminal 100 which may be then used by all applications for which the data consumption may be monitored.

In the case where the request does not include a user ID for the application, the user terminal 100 transmits a request for access to the data content on content provider server including identification data comprising the International Mobile Subscriber Identity (IMSI), the service key identifying the network service provider and the application identifier APP ID. The DPI 505 authenticates the identification data and creates a session between the application and the service provided by the content provider server. The DPI 505 then meters data consumption by the application on the user terminal 100.

If the service has any third party u.r.ls, for example from advertising servers, these may also be billed to the service account associated with the application.

In the case where the request includes a user ID associated with the user of the application to be executed. The user launches the application or widget on the user terminal 100. The local application will prompt the user for login details including a username, corresponding to the application user ID, and password if such data is not already saved in the application. The application transmits the request for access to the data content on content provider server 401 associated with the application including the application identifier APP ID via the APN 600. The APN 600 authenticates the application identifier APP ID and forwards the request to the content provider server 401 providing the service A. The content provider server 401 checks the user ID and interacts with the quota management server 307 with information including the data consumption limit corresponding to the user identified by the user ID and other information such as expiry date, service ID and optionally quality of service data. The quota management server 307 responds to the user terminal 100 via the deep packet inspection device 505. The deep packet inspection device 505 then meters data consumption by the application on the user terminal consuming data from the service A content provider server 401. The deep packet inspection device 505 provides data on the data consumption to the user terminal 100 and to other entities such as the billing system server 303 and the quota management server 307.

Figure 5:
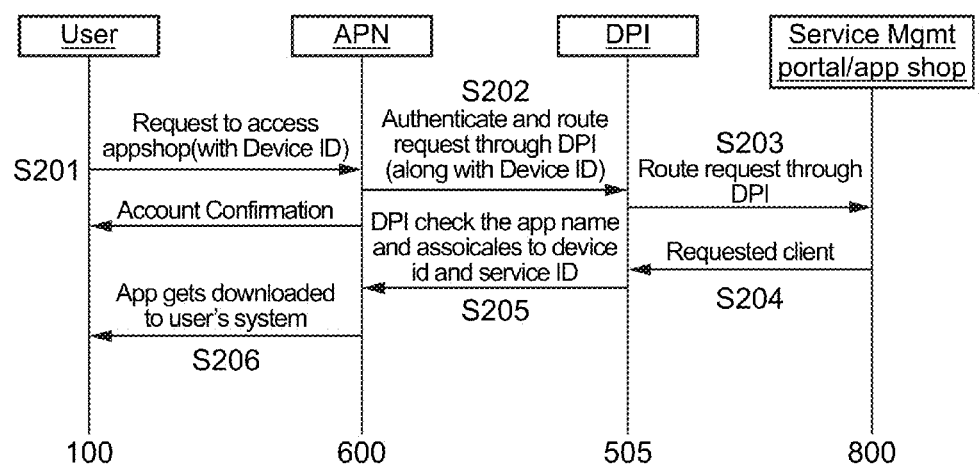
FIG. 5 is a communication diagram of a method of downloading an application to a user terminal according to an embodiment of the invention.

With reference to FIG. 5, a method of downloading an application to the user terminal 100 will be described. In step S201 the user of user terminal 100 accesses, by means of the user terminal 100, an application store providing the application he wishes to download. The request to access the application shop includes the user terminal ID and is transmitted from the user terminal 100 to the APN device 600. In step S202 the request is authenticated by the APN device 600 and routed via the DPI device 505 to the application shop server 800 in step S203. In step S204 the application shop server 800 responds to the request by sending the requested application via the DPI device 505 and the APN 600. In some cases a catalogue of available applications may be sent to the user via the DPI device 505 enabling the user to select an application for downloading. In step S205 the DPI device 505 meters the data activity between the application shop server 800 and the user terminal 100 and reports data to the billing center server 306 including data usage, time of data usage, user terminal ID etc. The billing center server 306 informs the service management portal 305 about download activity so that the user can be billed for downloading the application. The application is downloaded to the user terminal in step S206. Accordingly, downloading of widgets/applications can be billed to corresponding service provider.

Figure 6:
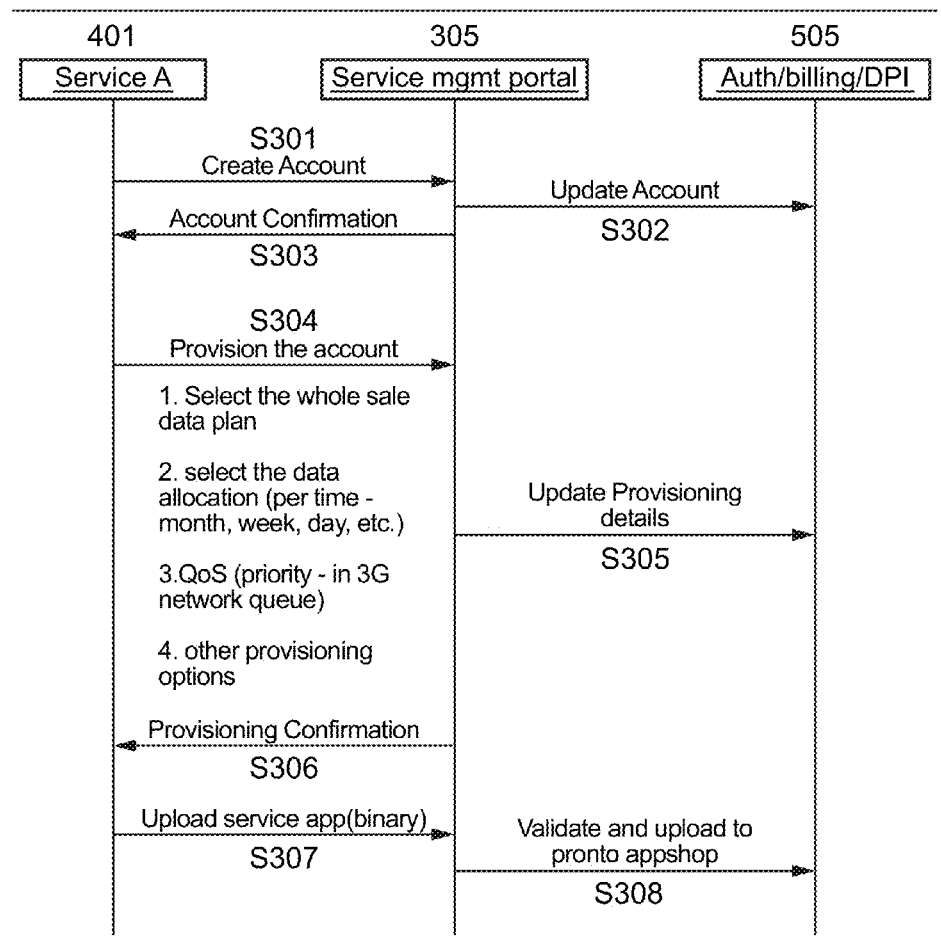
FIG. 6 is a communication diagram of a method of setting up an account for an application according to an embodiment of the invention.

With reference to FIG. 6 a method of setting up and provisioning a service account for a service A on a service management portal 305 is described. In step S401 an account is set up to enable data activity from the content provider server 401 of the service A and a user terminal to be monitored. The account may be updated in step S302 and confirmed to the content provider server in step S303. In step S402 the account may be provisioned with information defining billing plans per user and billing information. The provisioned information may include data representing Data allocation (per time—month, week, day, etc.)
    bandwidth (limit to 200 kbps, etc.)
    QoS (priority—in 3G network queue)
    plan definition per user type (for example premium users may have more data than non-premium)
    upload app to portal for approval The same portal may be used for service management including providing:

statistics on total data consumption of all users (individual usage is tracked at the service can also track data, etc.
    billing summaries
    information associated with an ability to increase/purchase additional wholesale data
    information associated with modification of filtering rules for users (ex. Removing access rights for unprofitable users)
    information associated with updating apps In the methods according to the embodiments of the invention enable a graphical user interface is modified to reflect data consumption giving the use an efficient way of managing his data consumption.

Although the present invention has been described hereinabove with reference to specific embodiments, the present invention is not limited to the specific embodiments, further embodiments may be envisaged.

For example, in some embodiments of the invention the application generating iconic representation of data consumption may be installed on the user terminal, while in alternative embodiments the generation of the iconic representation of data consumption may be a web based GUI application accessible on the user terminal by means of a browser on the user terminal.

Many further modifications and variations will suggest themselves to those versed in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for providing an indication of data consumption by an application, said application being executable on an electronic device and operable to consume data, via a network, from at least one remote content provider server, the method comprising:

providing, on the electronic device, an iconic representation for the application, wherein selection of the iconic representation triggers execution of the application by the electronic device, the iconic representation comprising an indication including an iconic data consumption portion representing previous data consumption by the application from said at least one remote content provider server during previous execution of the application;

executing the application on the electronic device in response to selection of the iconic representation;

receiving, from the network, data representative of new data consumption with the at least one remote content provider server during the execution of the application; and providing an updated iconic representation for the application wherein the updated iconic representation includes an indication of updated data consumption based on the received data representative of the new data consumption and the previous data consumption, wherein providing the updated iconic representation comprises updating at least one of a size or form of the iconic data consumption portion.

2. A method according to claim 1, wherein the iconic representation is updated after the application is exited.

3. A method according to claim 1, wherein usage of the application is associated with a data consumption allowance parameter defining a maximum data consumption limit for a user, the method further comprising comparing the updated data consumption with the data consumption allowance parameter; and at least one of exiting the application and receiving a notification, when the updated data consumption reaches the maximum data consumption.

4. A method according to claim 3, further comprising comparing the previous data consumption with the data consumption allowance parameter wherein if the previous data consumption parameter has reached the data consumption allowance parameter, the method further comprises at least one of receiving a notification prior to execution of the application and impeding execution of the application.

5. A method according to claim 1, further comprising transmitting, to the network, at least one of a user terminal identifier identifying the electronic device, an application identifier identifying the application being executed, and a user identifier identifying the user of application being executed.

6. A method according to claim 1, wherein the iconic representation is generated by a network server and accessible on the electronic device by using a browser page.

7. A method according to claim 1 the iconic representation is generated by an data consumption application on the electronic device.

8. A method for providing an indication of data consumption by an application, said application being executable on an electronic device and operable to consume data, via a network, from at least one remote content provider server, the method comprising:

providing an iconic representation for the application, which is configured such that selection of the iconic representation on the electronic device triggers execution of the application by the electronic device, the iconic representation comprising an indication including an iconic data consumption portion representing previous data consumption by the application from said at least one remote content provider server during previous execution of the application;

identifying, on the network, data traffic, associated with the application, between the electronic device and the at least one remote content provider server;

measuring the data traffic to determine new data consumption of the application on the electronic device from the at least one remote content provider server during the execution of the application; and transmitting, from the network to the electronic device, data representative of new data consumption to enable an updated iconic representation for the application to be provided, wherein the updated iconic representation includes an indication of updated data consumption based on the received data representative of the new data consumption and the previous data consumption, wherein the updated iconic representation comprises at least one of an updated size or form of the iconic data consumption portion.

9. A method according to claim 8, further comprising receiving at least one of a user terminal identifier identifying the electronic device, an application identifier identifying the application being executed, a user identifier identifying the user of the application being executed, and a service provider key identifying the service provider providing network service to the electronic device.

10. A method according to claim 9, further comprising receiving a request from the electronic device to access data on the at least one remote content provider server;

verifying authenticity of the request based on at least one of the user terminal identifier, the application identifier, and the user identifier; and enabling a session between the at least one remote content provider server and the electronic device for the flow of data traffic between the at least one remote content provider and the electronic device, in the case where the request is authenticated.

11. A method according to claim 8, further comprising receiving a data consumption allowance parameter defining a maximum data consumption limit, the method further comprising comparing the updated data consumption with the data consumption allowance parameter; and terminating the session between the electronic device and the content provider server and/or transmitting a notification, to the electronic device, when the updated data consumption exceeds the maximum data consumption.

12. A method according to claim 11, further comprising determining data access rights for data traffic between the at least one content provider server and the electronic device according to the data consumption allowance parameter and the updated data consumption data.

13. A user terminal operable to receive data via a network, the user terminal comprising a display configured to display an iconic representation of an application that is executable on the user terminal to consume data, via the network, from at least one remote content provider server, wherein selection of the iconic representation triggers execution of the application by the electronic device, the iconic representation comprising an indicator including an iconic data consumption portion representing previous data consumption by the application from said at least one remote content provider server during previous execution of the application;

a transceiver configured to receive, from the network, data representative of new data consumption with the at least one remote content provider server during the execution of the application; and a processor configured to provide an updated iconic representation for the application, wherein the indicator of the updated iconic representation indicates updated data consumption based on the received data representative of the new data consumption and the previous data consumption, wherein the updated iconic representation comprises at least one of an updated size or form of the iconic data consumption portion.

14. A user terminal according to claim 13, wherein usage of the application is associated with a data consumption allowance parameter defining a maximum data consumption limit for a user, the processor being configured to compare the updated data consumption with the data consumption allowance parameter; and to perform at least one of exiting the application and processing a received notification, when the updated data consumption reaches the maximum data consumption.

15. A user terminal according to claim 14, wherein the processor is configured to compare the previous data consumption with the data consumption allowance parameter, and wherein if the previous data consumption parameter has reached the data consumption allowance parameter, the processor is configured to perform at least one of processing a received notification prior to execution of the application and impeding execution of the application.

16. A non-transient carrier medium comprising a computer program product stored thereon for a data-processing device, the computer program product comprising a set of instructions which, when loaded into the data-processing device, causes the device to perform the method for providing an indication of data consumption by an application said application being executable on an electronic device and operable to consume data, via a network, from at least one remote content provider server, the computer program comprising instructions for:

providing, on the electronic device, an iconic representation for the application, wherein selection of the iconic representation triggers execution of the application by the electronic device, the iconic representation comprising an indication including an iconic data consumption portion representing previous data consumption by the application from said at least one remote content provider server during previous execution of the application;

executing the application on the electronic device in response to selection of the iconic representation;

receiving, from the network, data representative of new data consumption with the at least one remote content provider server during the execution of the application; and providing an updated iconic representation for the application wherein the updated iconic representation includes an indication of updated data consumption based on the received data representative of the new data consumption and the previous data consumption, wherein providing the updated iconic representation comprises updating at least one of a size or form of the iconic data consumption portion.

* * * * *